(12) United States Patent
Chen

(10) Patent No.: US 7,193,611 B2
(45) Date of Patent: Mar. 20, 2007

(54) COMPUTER CURSOR POINTING DEVICE WITH ELECTRIC STIMULATOR

(76) Inventor: Yu-Yu Chen, 2Fl., No. 349, Wushing St., Shinyi Chiu, Taipei (TW) 110

( * ) Notice: Subject to any disclaimer, the term of this patent is extended or adjusted under 35 U.S.C. 154(b) by 471 days.

(21) Appl. No.: 10/733,329

(22) Filed: Dec. 12, 2003

(65) Prior Publication Data
US 2005/0128187 A1    Jun. 16, 2005

(51) Int. Cl.
*G09G 5/08* (2006.01)

(52) U.S. Cl. ............. 345/163; 345/156; 345/157; 601/46; 607/45

(58) Field of Classification Search ......... 345/156, 345/163, 157; 128/741; 601/46, 64; 607/40, 607/45
See application file for complete search history.

(56) References Cited

U.S. PATENT DOCUMENTS

| | | | | |
|---|---|---|---|---|
| 5,540,235 A | * | 7/1996 | Wilson | 600/554 |
| 5,686,005 A | * | 11/1997 | Wright, Sr. | 219/549 |
| 6,266,047 B1 | * | 7/2001 | Benja-Athon | 345/163 |
| 6,323,841 B1 | * | 11/2001 | Lai | 345/163 |
| 2002/0072780 A1 | * | 6/2002 | Foley | 607/40 |
| 2003/0088185 A1 | * | 5/2003 | Prass | 600/546 |
| 2003/0092219 A1 | * | 5/2003 | Ohuchi et al. | 438/110 |
| 2004/0068204 A1 | * | 4/2004 | Imran et al. | 600/593 |
| 2004/0138720 A1 | * | 7/2004 | Naisberg et al. | 607/45 |
| 2004/0149051 A1 | * | 8/2004 | Mieda et al. | 73/862.625 |

* cited by examiner

*Primary Examiner*—Richard Hjerpe
*Assistant Examiner*—Kimnhung Nguyen
(74) *Attorney, Agent, or Firm*—Rosenberg, Klein & Lee

(57) ABSTRACT

A computer cursor pointing device with an electric stimulator is disclosed, including a casing, a first electrode which is mounted at the top surface of the casing, a second electrode which is also mounted at the top surface of the casing and is close to and insulated from the first electrode, and a stimulator circuit for generating a pair of stimulating signals to the first electrode and the second electrode respectively. When a user puts his hand on the computer cursor pointing device, the hollow of his palm rests on the first electrode and the second electrode. The stimulating signal drives the first electrode and the second electrode to electrically stimulate the user's palm.

6 Claims, 5 Drawing Sheets

COMPUTER CURSOR POINTING DEVICE WITH ELECTRIC STIMULATOR

BACKGROUND OF THE INVENTION

1. Field of the Invention

The preset invention relates to a computer cursor pointing device, and more particularly to a computer cursor pointing device with an electric stimulator.

2. Description of the Prior Art

With the advancement and popularization of technology, computer has been become an indispensable equipment that can provide high efficient communication, assist the handling of work and provide entertainment in family. Nowadays, most families are equipped with a computer. To operate a computer, at least one input device is required. Among the various input devices, mouse is the one of the most common and essential input devices for inputting commands or making selections. Practically, a user has to repeatedly operate a mouse when using a computer. As most people substantially rely on computer, it is found that the operation time of a mouse has been increasing.

There are a variety of conventional cursor pointing device including wired mouse, wireless mouse, optical mouse and so on. However, none of the commercially available products are appropriate for long time use. The extensive use of mouse often causes aches to the hand, forearm or even the shoulder of the user. Clinically, many computer users are found to suffer from a disease named carpal tunnel syndrome. However, as there is no other device that can replace a computer, no matter how painful the user is, he has to keep on operating the mouse.

Actually, most of the conventional cursor pointing device are designed to match the functions of a computer and they do not fit the personal requirements of users. It is desired to develop a mouse with electric stimulator which is good for health.

SUMMARY OF THE INVENTION

Thus, a primary object of the present invention is to provide a computer cursor pointing device with electric stimulator, so that when a user operates the cursor pointing device, he also receives electrical stimulation. The user can turn on or off the electric stimulator and regulate the intensity of electrical stimulation in accordance with his requirement.

To achieve the above and other objects, in accordance with the present invention, there is provided with a computer cursor pointing device with electric stimulator. The computer cursor pointing device comprises a casing which includes a top surface and a cavity therein, a first electrode which is mounted at the top surface of the casing, a second electrode which is also mounted at the top surface of the casing and is near to and insulated from the first electrode, and a stimulator circuit for generating a stimulating signal to the first electrode and the second electrode.

In a preferred embodiment, the first electrode is configured to have a round protrusion that protrudes at a predetermined height from the top surface of the casing. The second electrode has a flat structure and surrounds the rim of the first electrode. The second electrode is insulated from the first electrode by means of an insulating annulus. A regulating switch is disposed at one end of the cursor pointing device for controlling the on/off of the electric stimulation device and regulating the intensity of electric stimulation.

By means of the technology employed, the computer cursor pointing device provides electric stimulation to the user when he operates the mouse. He can regulate the intensity of electric stimulation and performs electric stimulation. Thereby, the fatigue and aches caused by extensive use of mouse can be soothed.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
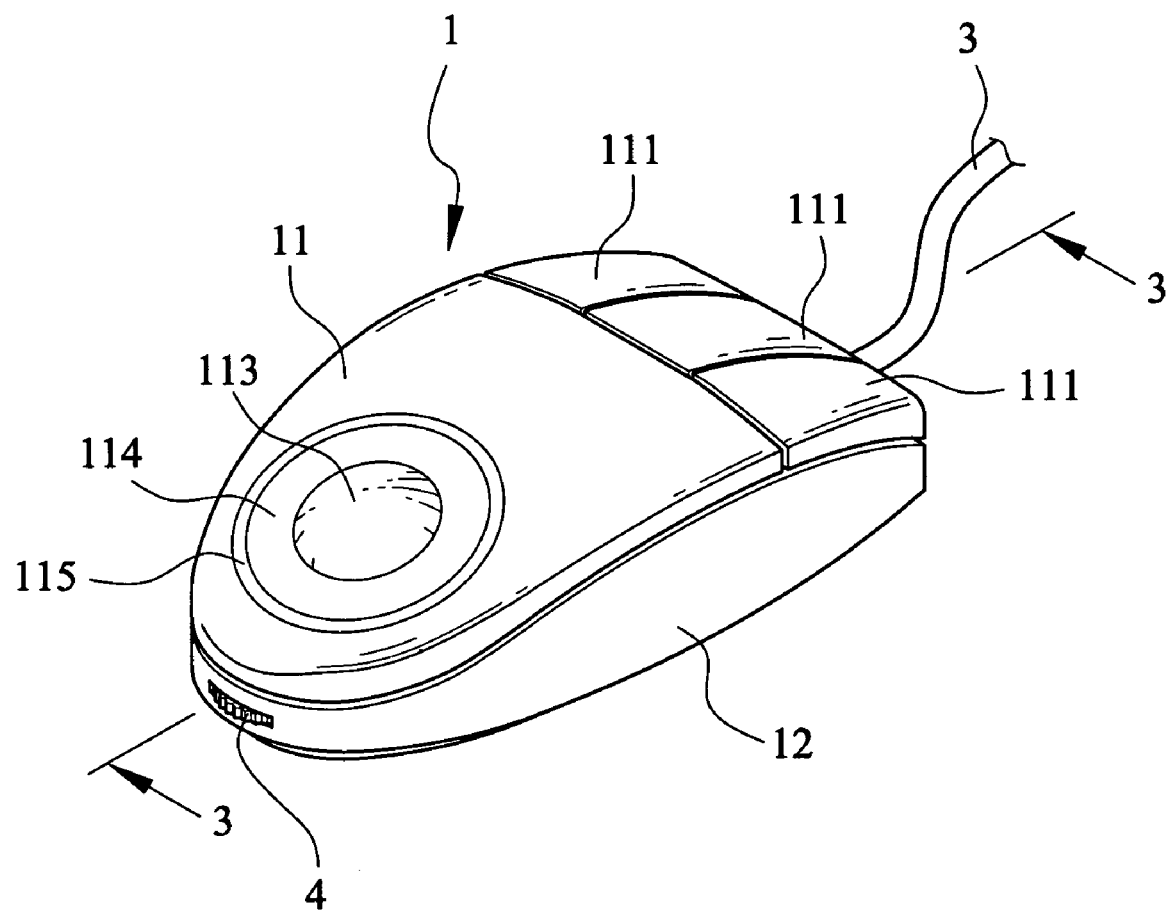
FIG. 1 is a perspective view of a computer cursor pointing device with electric stimulator constructed in accordance with a first embodiment of the present invention.
Figure 2:
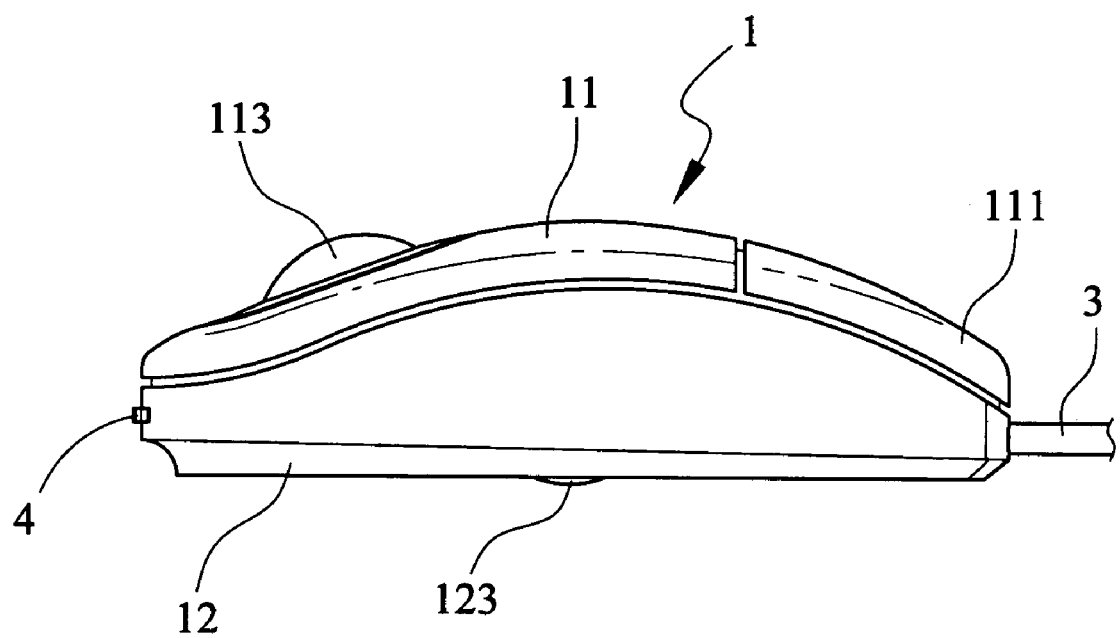
FIG. 2 is a side view of the computer cursor pointing device of the present invention.
Figure 3:
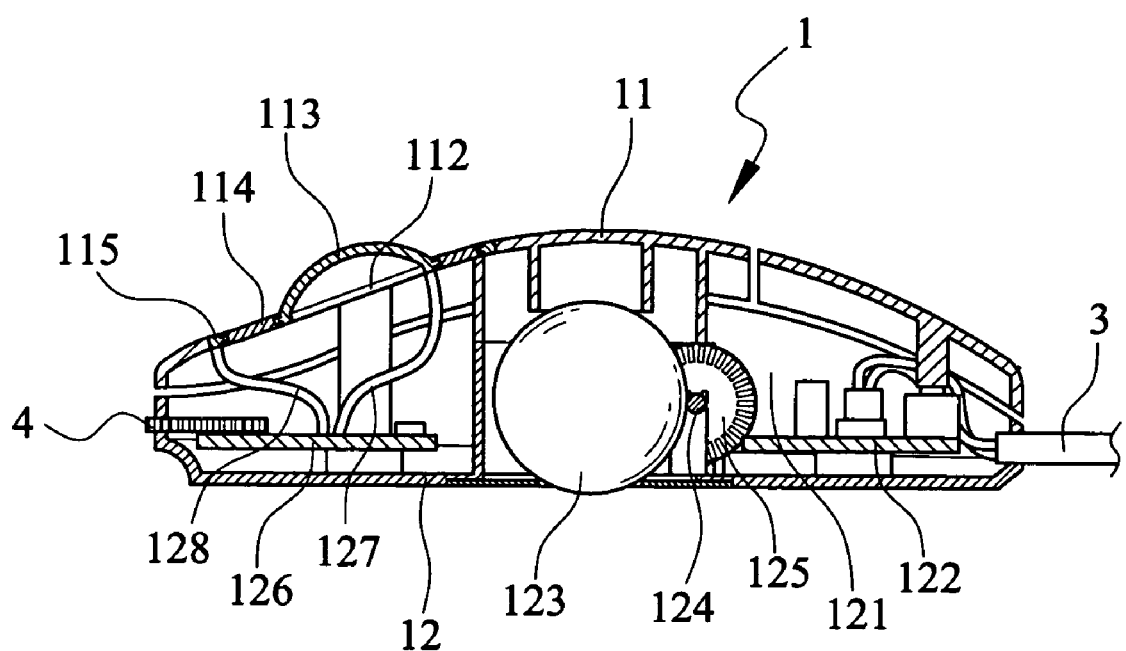
FIG. 3 is a sectional view of the computer cursor pointing device, taken along line 3—3 of FIG. 1.

Please refer to the drawings and in particular to FIGS. 1 to 3. FIG. 1 shows a perspective view of a computer cursor pointing device constructed according to a first embodiment of the present invention. FIG. 2 is a right side view of the computer cursor pointing device. FIG. 3 is a sectional view of the computer cursor pointing device taken along line 3—3 of FIG. 1. As shown, the computer cursor pointing device 1 comprises a casing including an upper casing 11 and a lower casing 12 in engagement with the upper casing 11 to form an inner space therein. One end of the upper casing 11 is connected with a connecting wire 3 for connecting to a communication port of a computer (not shown).

A plurality of operable buttons 111 are arranged on the upper casing 11 that are provided for operating the computer. Please also refer to FIG. 3. A recess 112 is formed at an appropriate section e.g. the central part of the upper casing 11, that is mounted with a first electrode 113. In a preferred embodiment, the first electrode 113 is spherical in structure that protrudes a predetermined distance from the upper surface of the upper casing 11.

An insulating annulus 114 is mounted around a rim of the first electrode 113, and a ring shape second electrode 115 is mounted around an external circumference of the insulating annulus 114. The second electrode 115 is positioned at a top surface of the upper casing 11 and encompasses the first electrode 113. Accordingly, the second electrode 115 is insulated from the first electrode 113 by the insulating annulus 114 therebetween.

The first electrode 113 and the second electrode 115 are formed of metal. Alternatively, they may be formed of plastics like Acrylonitrile Butadiene Styrene (ABS) and coated with a conductive metal layer on the surface thereof.

The lower casing 12 is formed with an internal cavity 121 with a circuit board 122 mounted therein. The circuit board 122 is connected with the connecting wire 3 for getting working power and receiving signals from and transmitting signals to the computer.

The central part of the lower casing 12 is formed with a hole where a roller ball 123 is disposed thereon. The roller ball 123 may closely engage with an shaft 124 whose one end is coupled with an encoder wheel 125. Whenever the roller ball 123 rolls, the encoder wheel 125 rotates, and thereby the displacement of the computer cursor pointing device 1 is detected.

A stimulator circuit board 126 is also mounted in the cavity 121 of the lower casing 12. A stimulator circuit is arranged on the stimulator circuit board 126. The stimulator circuit board 126 is connected with a pair of wires 127, 128 which are respectively connected to the first electrode 113 and the second electrode 115 at the upper casing 11.

At an appropriate position of one end of the lower casing 12, a regulating switch 4 is mounted. The user is able to regulate the intensity of electric stimulation by means of the ratable switch 4. Preferably, the regulating switch 4 is combined with a power control function for turning on/off the electric power to the stimulator circuit on the stimulator circuit board 126.

Figure 4:
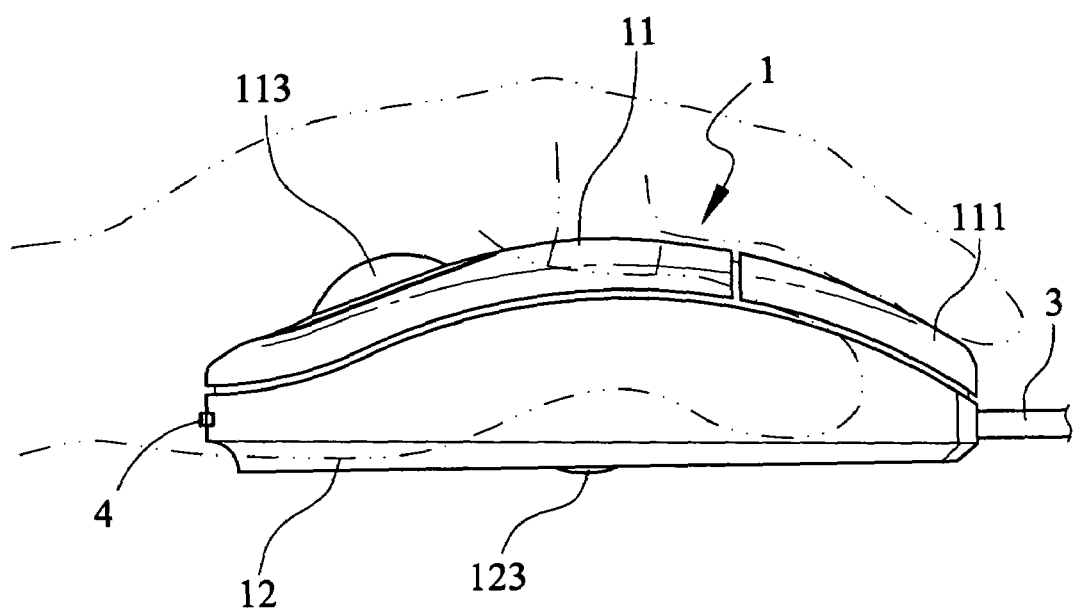
FIG. 4 is a side view showing a user's hand resting upon the computer cursor pointing device of the present invention.

FIG. 4 is a side view showing a user's hand resting upon the computer cursor pointing device of the present invention. As shown, when the user grips and moves the computer cursor pointing device 1 to move the cursor shown on a display of a computer system, the hollow of the user's palm is just situated at the region where the first electrode 113 and the second electrode 115 are located and contacts the first electrode 113 and the second electrode 115. Hence, the computer cursor pointing device 1 performs electrically stimulation to the user's palm by means of the first electrode 113 and the second electrode 115 during the computer cursor moving or pointing operation.

Figure 5:
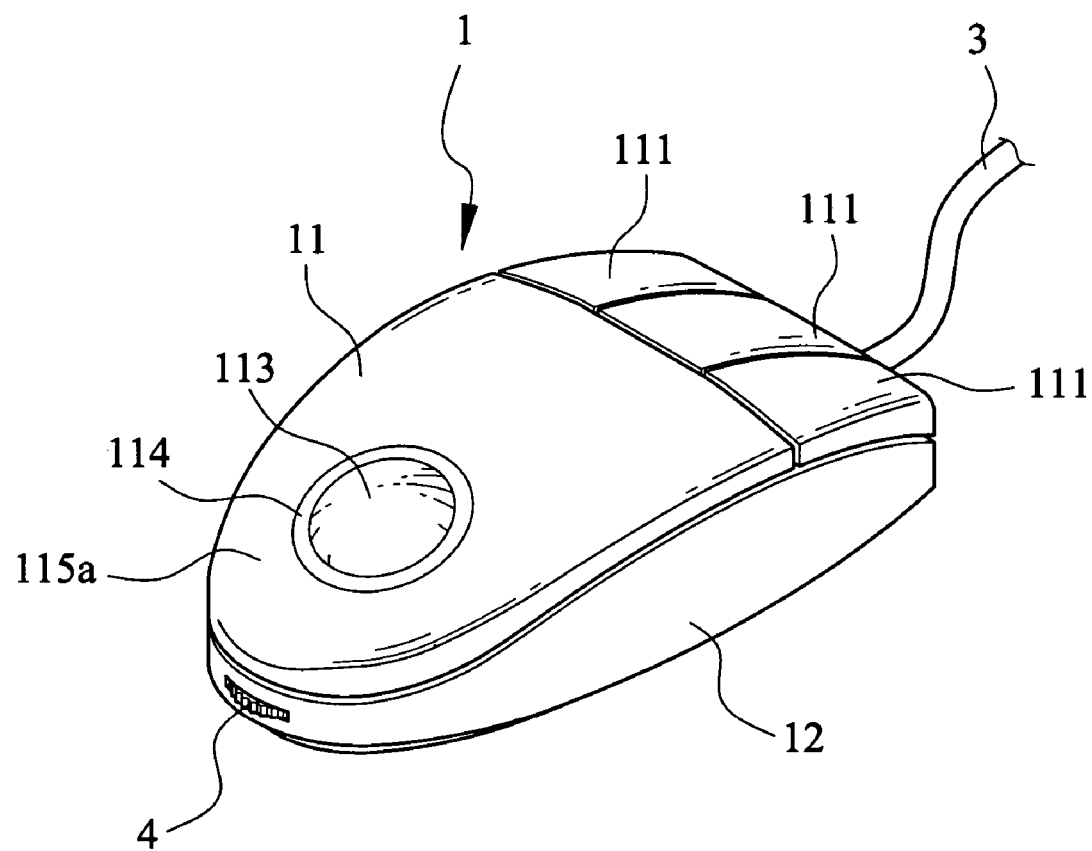
FIG. 5 is a perspective view of a computer cursor pointing device with electric stimulator constructed in accordance with a second embodiment of the present invention.

FIG. 5 is a perspective view of the computer cursor pointing device in accordance with a second embodiment of the present invention. In this embodiment, the entire top surface of the upper casing 11 acts as the second electrode 115a, while in the first embodiment, the second electrode 115 is in the form of an annulus structure that surrounds the insulating annulus 114 and the first electrode 113. Therefore, the second electrode 115a of this embodiment provides a large contact surface and secures a good contact with the user's hand. The other components of the computer cursor pointing device 1 is the second embodiment are same as that in the first embodiment. Accordingly, when the user puts his hand on the computer cursor pointing device 1, the hollow of his palm rests on the first electrode 113 and the second electrode 115a. By means of the first electrode 113 and the second electrode 115a, the computer cursor pointing device 1 is able to electrically stimulate the user's palm.

Figure 6:
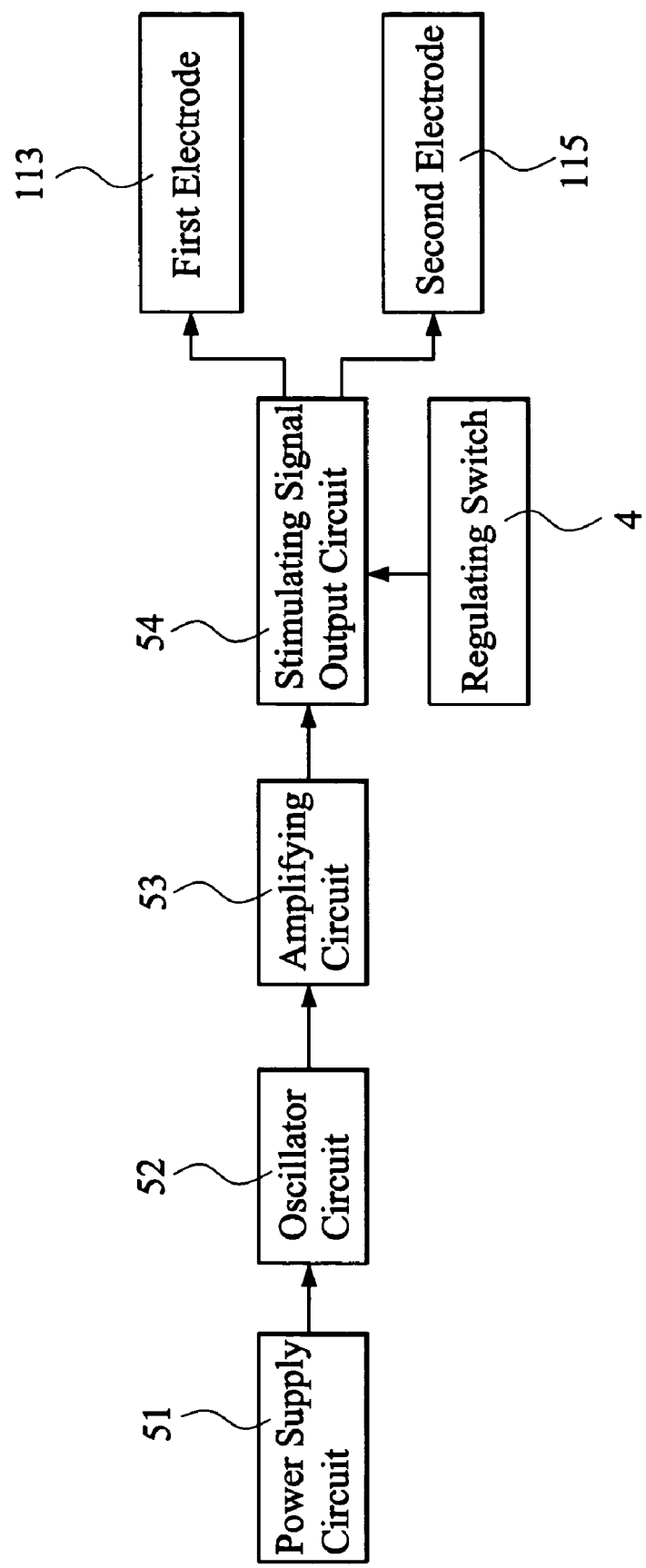
FIG. 6 is a functional block diagram showing a circuitry of the computer cursor pointing device.

Please refer to FIG. 6 which is a circuit block diagram showing a circuitry of the computer cursor pointing device with electric stimulator of the present invention. The computer cursor pointing device 1 mainly comprises a stimulator circuit and a mouse circuit. The mouse circuit comprises a conventional control circuit. The stimulator circuit comprises a power supply circuit 51, an oscillator circuit 52, an amplifying circuit 53 and a stimulating signal output circuit 54.

The power supply circuit 51 and the mouse circuit may get electric power from the same power source. The power supply circuit 51 supplies an electric power to the oscillator circuit 52 which generates an oscillating signal at a predetermined oscillation frequency. The oscillating signal generated by the oscillator circuit 52 is transmitted to the amplifying circuit 53 for amplifying and then forwarded to the stimulating signal output circuit 54. The stimulating signal output circuit 54 generates two stimulating signals, one to the first electrode 113 and one to the second electrode 115. Via the regulating switch 4, the intensity of the stimulating signals of the stimulating signal output circuit 54 may be regulated.

In the embodiments, the first electrode 113 has a spherical structure protruded above the top surface of the upper casing 11 and is situated at the central part of the upper casing 11, and the second electrode 115 has a flat structure. However, it is understood that in practical application, the first electrode 113 and the second electrode 115 can be of any structures and shapes and are not limited to the described forms. For example, the first electrode 113 and the second electrode 115 may be arranged on the upper casing 11 with a suitable distance therebetween.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A computer cursor pointing device with an integrally formed electric stimulator comprising:
    a casing having a top surface and a cavity therein;
    a first electrode mounted at the top surface of the casing;
    a second electrode, which is mounted at the top surface of the casing and is disposed in close proximity to the first electrode, the second electrode being electrically insulated from the first electrode; and
    a stimulator circuit for generating a pair of stimulating signals to the first electrode and the second electrode respectively;
    wherein when a user puts his hand on the top surface of the casing to operate the pointing device,
    the stimulating signals from the stimulator circuit are transmitted to the first electrode and the second electrode to perform an electric stimulation to the user's hand,
    said electric stimulator simultaneously operable during use of the pointing device.

2. The computer cursor pointing device as claimed in claim 1, wherein the first electrode is spherical in structure and protrudes at a predetermined distance from the top surface of the casing.

3. The computer cursor pointing device as claimed in claim 2, wherein the first electrode is mounted at a recess formed at the top surface of the casing.

4. The computer cursor pointing device as claimed in claim 1, wherein the second electrode is ring shape and surrounds the first electrode, the second electrode being insulated from the first electrode by means of an insulating annulus.

5. A computer cursor pointing device as claimed in claim 1, wherein the second electrode has a flat structure and surrounds the first electrode, the second electrode being insulated from the first electrode by means of an insulating annulus.

6. A computer cursor pointing device as claimed in claim 1, wherein the casing is further provided with a regulating switch for regulating an intensity of the stimulating signals.

* * * * *